(12) United States Patent
Jang et al.

(10) Patent No.: US 11,228,061 B2
(45) Date of Patent: Jan. 18, 2022

(54) BATTERY MODULE AND BATTERY MODULE MANUFACTURING METHOD

(71) Applicant: LG Chem, Ltd., Seoul (KR)

(72) Inventors: Seok-Ho Jang, Daejeon (KR); Jun-Yeob Seong, Daejeon (KR)

(73) Assignee: LG Chem, Ltd.

( * ) Notice: Subject to any disclaimer, the term of this patent is extended or adjusted under 35 U.S.C. 154(b) by 79 days.

(21) Appl. No.: 16/477,405

(22) PCT Filed: Jul. 17, 2018

(86) PCT No.: PCT/KR2018/008088
§ 371 (c)(1),
(2) Date: Jul. 11, 2019

(87) PCT Pub. No.: WO2019/031723
PCT Pub. Date: Feb. 14, 2019

(65) Prior Publication Data
US 2020/0028216 A1    Jan. 23, 2020

(30) Foreign Application Priority Data
Aug. 10, 2017  (KR) .......................... 10-2017-0101854

(51) Int. Cl.
*H01M 10/42*  (2006.01)
*H01M 50/20*  (2021.01)
(Continued)

(52) U.S. Cl.
CPC .......... *H01M 10/425* (2013.01); *H01M 50/20* (2021.01); *H01M 50/502* (2021.01); *H01M 50/531* (2021.01); *H01M 2220/20* (2013.01)

(58) Field of Classification Search
CPC ........ H01M 2/22; H01M 2/02; H01M 2/1077; H01M 2220/20; H01M 2010/4278; H01M 2/206; H01M 10/425
See application file for complete search history.

(56) References Cited

U.S. PATENT DOCUMENTS

2011/0293995 A1   12/2011  Sasaki et al.
2012/0183840 A1*   7/2012  Lee ..................... H01M 50/502
                                                              429/158
(Continued)

FOREIGN PATENT DOCUMENTS

CN   102754240 A   10/2012
CN   106133948 A   11/2016
(Continued)

OTHER PUBLICATIONS

Search report from International Application No. PCT/KR2018/008088, dated Oct. 23, 2018.
(Continued)

*Primary Examiner* — Maria Laios
*Assistant Examiner* — Bartholomew A Hornsby
(74) *Attorney, Agent, or Firm* — Lerner, David, Littenberg, Krumholz & Mentlik, LLP

(57) ABSTRACT

A battery module includes: a battery cell stack including a plurality of battery cells respectively having electrode leads, the plurality of battery cells being stacked on one another; and an interconnect board (ICB) cover to which an electrode lead connection that is bent is coupled, the electrode lead connection comprising an electrode lead of any one of the plurality of battery cells and an electrode lead of another battery cell adjacent to the any one battery cell connected to each other, wherein a plurality of the ICB covers is provided, and the plurality of ICB covers are arranged in different layers.

15 Claims, 5 Drawing Sheets

(51) Int. Cl.
    *H01M 50/502*    (2021.01)
    *H01M 50/531*    (2021.01)

(56) References Cited

U.S. PATENT DOCUMENTS

| | | | |
|---|---|---|---|
| 2014/0370366 A1 | 12/2014 | Higuchi et al. | |
| 2015/0037626 A1* | 2/2015 | Malcolm | H01M 2/206 429/53 |
| 2017/0062882 A1 | 3/2017 | Kim | |
| 2017/0125774 A1 | 5/2017 | Choi et al. | |
| 2017/0125775 A1* | 5/2017 | Chen | B23K 20/10 |
| 2017/0331097 A1 | 11/2017 | Lee et al. | |
| 2017/0343615 A1 | 11/2017 | Lee et al. | |
| 2018/0006281 A1 | 1/2018 | Eom et al. | |
| 2018/0159096 A1 | 6/2018 | Kim et al. | |

FOREIGN PATENT DOCUMENTS

| | | | | |
|---|---|---|---|---|
| EP | 1271672 A1 * | 1/2003 | | H01M 2/1061 |
| JP | 2001210293 A | 8/2001 | | |
| JP | 20100161044 A | 7/2010 | | |
| JP | 2013519214 A | 5/2013 | | |
| JP | 5398273 B2 | 1/2014 | | |
| JP | 20152140 A | 1/2015 | | |
| JP | 2017084468 A | 5/2017 | | |
| KR | 20090104584 A | * | 10/2009 | H05K 3/308 |
| KR | 20130142652 A | 12/2013 | | |
| KR | 101363598 B1 | 2/2014 | | |
| KR | 20140043506 A | 4/2014 | | |
| KR | 20160077762 A | 7/2016 | | |
| KR | 20160077765 A | 7/2016 | | |
| KR | 20160080358 A | 7/2016 | | |
| KR | 20160104927 A | 9/2016 | | |
| KR | 20170050508 A | 5/2017 | | |
| KR | 20170054878 A | 5/2017 | | |
| WO | WO-2017014472 A1 * | 1/2017 | | H01M 10/4257 |
| WO | 2017073908 A1 | 5/2017 | | |
| WO | 2017082528 A1 | 5/2017 | | |

OTHER PUBLICATIONS

Extended European Search Report with Written Opinion for Application No. 18843547.3 dated Apr. 3, 2020, 8 pages.
Search Report for Chinese Application No. 201880010647.9 dated Jul. 20, 2021. 3 pgs.

* cited by examiner

BATTERY MODULE AND BATTERY MODULE MANUFACTURING METHOD

CROSS-REFERENCE TO RELATED APPLICATIONS

The present application is a national phase entry under 35 U.S.C. § 371 of International Application No. PCT/KR2018/008088, filed Jul. 17, 2018, which claims priority from Korean Patent Application No. 10-2017-0101854 filed on Aug. 10, 2017, the disclosures of which are incorporated herein by reference.

TECHNICAL FIELD

The present disclosure relates to a battery module and a method for manufacturing the battery module, and more particularly, to a battery module and a method for manufacturing the battery module, which may ensure a welding pitch between electrode leads even though battery cells have a small cell thickness.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

FIG. 1 is a cross-sectional view showing a conventional battery cell, and FIG. 2 is a cross-sectional view showing that an interference occurs at electrode leads when the cell thickness is reduced at the conventional battery cell. Here, it should be understood that the battery cell is exaggerated in FIG. 2, compared to an actual battery cell, in order to show a problem occurring when welding a battery cell that has a reduced cell thickness.

In order to electrically connect the electrode lead 2 of the battery cell 1, welding is used. At this time, in order to ensure the welding quality of the electrode leads 2 of the battery cell 1, a predetermined welding pitch X, for example a welding pitch X of about 7 mm, should be obtained.

Referring to FIG. 1, in case of the conventional battery cell 1, the cell thickness t1 is sufficiently thick, and thus the welding pitch X may be obtained even though the electrode leads 2 are bent and then welded. However, recently, the cell thickness t2 of the battery cell 1 has tended to become thinner, as shown in FIG. 2. If the cell thickness t2 of the battery cell 1 is reduced as above, when the electrode leads 2 are bent, mutual interference occurs at the bending portions between the electrode leads 2 (see the portion I in FIG. 2), so it is difficult to obtain the predetermined welding pitch X.

DISCLOSURE

Technical Problem

The present disclosure is directed to providing a battery module and a method for manufacturing the battery module, which may ensure a predetermined welding pitch for welding electrode leads even though battery cells have a small cell thickness.

In addition, the present disclosure is directed to providing a battery module and a method for manufacturing the battery module, which may obtain a predetermined welding pitch to improve the welding quality by preventing an interference between the electrode leads at welding.

Technical Solution

In one aspect of the present disclosure, there is provided a battery module, comprising: a battery cell stack including a plurality of battery cells respectively having electrode leads, the plurality of battery cells being stacked on one another; and an interconnect board (ICB) cover to which an electrode lead connection at which an electrode lead of any one battery cell among the plurality of battery cells and an electrode lead of another battery cell adjacent to the any one battery cell are connected to each other is bent and coupled, wherein the ICB cover is provided in plural, and the plurality of ICB covers are arranged in different layers.

Also, the plurality of ICB covers arranged in different layers may be disposed along different virtual straight lines, respectively.

In addition, the ICB cover may include a bus bar electrically connected to the electrode lead connection.

Also, the plurality of ICB covers may include: a first ICB cover disposed at a location adjacent to a body of the battery cell; and a second ICB cover disposed at a location farther from the body of the battery cell than the first ICB cover.

In addition, the battery module may further include a plurality of first electrode lead connections coupled to the first ICB cover and a plurality of second electrode lead connections coupled to the second ICB cover, and the plurality of first electrode lead connections and the plurality of second electrode lead connections may be arranged alternately.

Also, the first electrode lead connection and the second electrode lead connection may be bent without contacting each other.

In addition, the electrode lead connection may have a first bent portion bent from a linear portion of the electrode lead and a second bent portion bent at a region extending from the first bent portion.

Also, the first bent portion of the first electrode lead connection and the first bent portion of the second electrode lead connection may be bent to have different angles or different shapes._

In addition, the first bent portion of the first electrode lead connection and the first bent portion of the second electrode lead connection may be bent in directions opposite to each other.

Meanwhile, in another aspect of the present disclosure, there is also provided a method for manufacturing a battery module, comprising: (a) providing a plurality of battery cells respectively having electrode leads and stacking the plurality of battery cells on one another; (b) bending an electrode lead connection at which an electrode lead of any one battery cell among the plurality of battery cells and an electrode lead of another battery cell adjacent to the any one battery cell are connected to each other, and coupling the electrode lead connection to an ICB cover; and (c) providing a plurality of ICB covers so that the plurality of ICB covers have different layers.

Also, the step (b) may include: (b1) disposing a first ICB cover at a location adjacent to a body of the battery cell; and (b2) disposing a second ICB cover at a location farther from the body of the battery cell than the first ICB cover.

In addition, the step (b) may include bending and welding a plurality of first electrode lead connections coupled to the first ICB cover, and then bending and welding a plurality of second electrode lead connections coupled to the second ICB cover.

Also, the step (b) may include bending the first electrode lead connection and the second electrode lead connection without contacting each other.

In addition, the electrode lead connection may have a first bent portion bent from a linear portion of the electrode lead and a second bent portion bent at a region extending from the first bent portion, and the step (b) may include bending the first bent portion of the first electrode lead connection and the first bent portion of the second electrode lead connection to have different angles or different shapes.

Meanwhile, in another aspect of the present disclosure, there is also provided a battery pack including the battery module described above, and there is also provided a vehicle including the battery module.

Advantageous Effects

According to the embodiments of the present disclosure, since an ICB cover to which electrode leads are coupled is arranged in different layers, even though the battery cells have a small cell thickness, it is possible to obtain a predetermined welding pitch for welding between the electrode leads.

In addition, by obtaining the predetermined welding pitch, it is possible to prevent an interference between the electrode leads at welding and thus improve the welding quality.

BEST MODE

Figure 1:
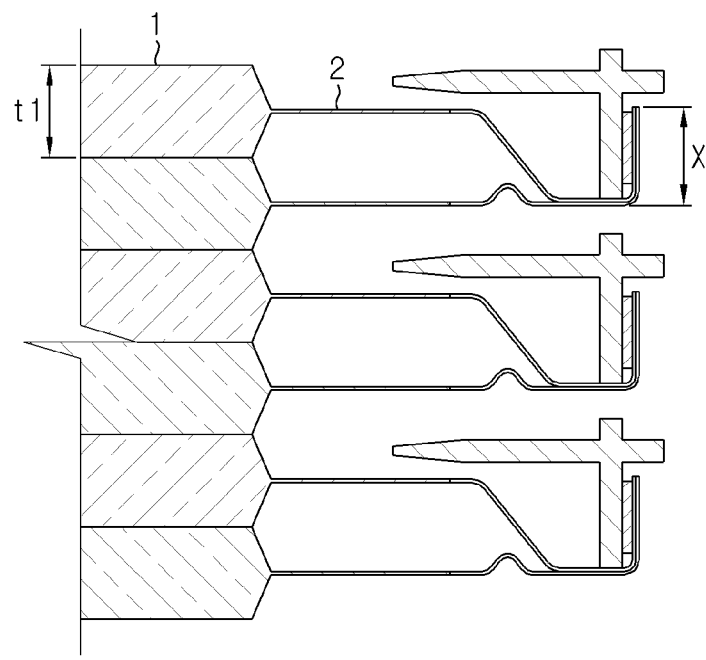
FIG. 1 is a cross-sectional view showing a conventional battery cell.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 3:
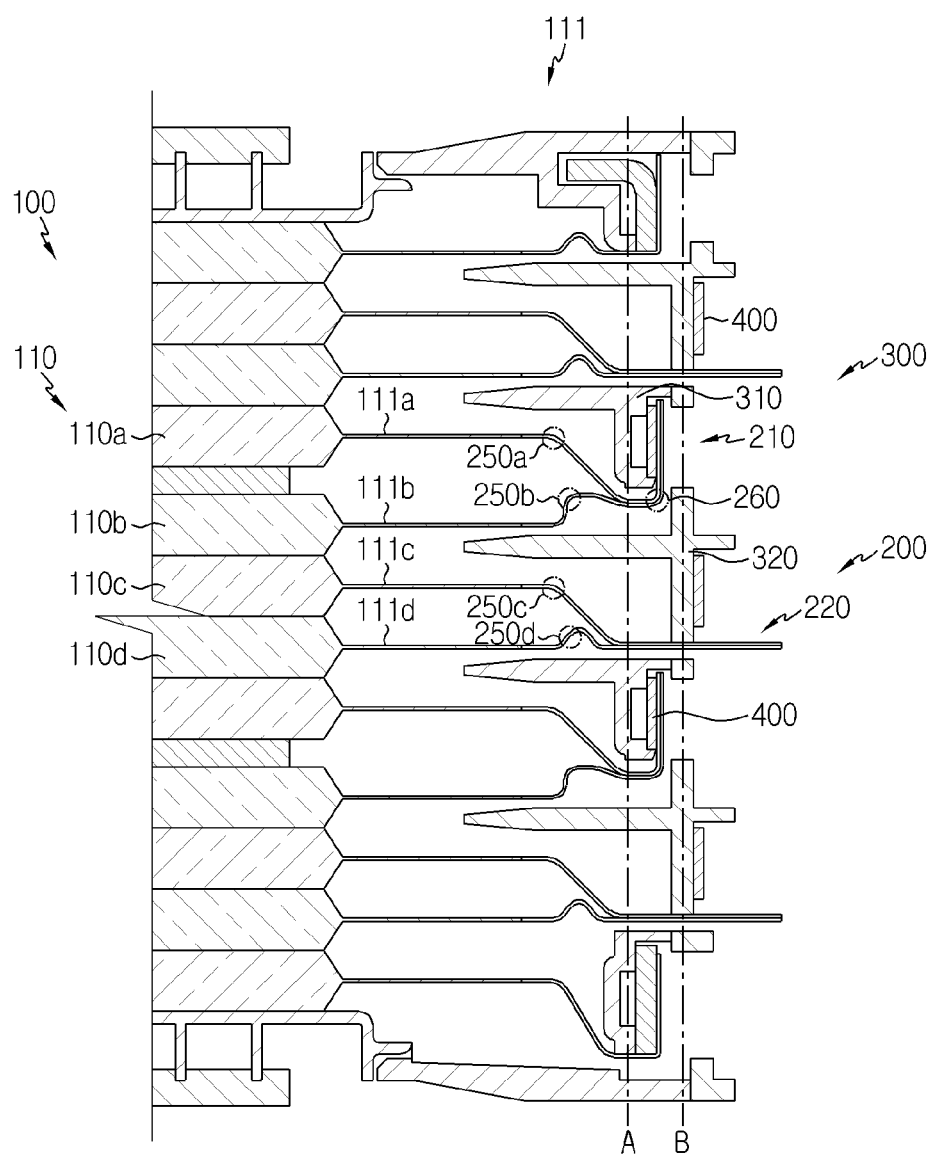
FIG. 3 is a cross-sectional view showing that a first electrode lead connection is coupled to a first ICB cover at a battery module according to an embodiment of the present disclosure.
Figure 4:
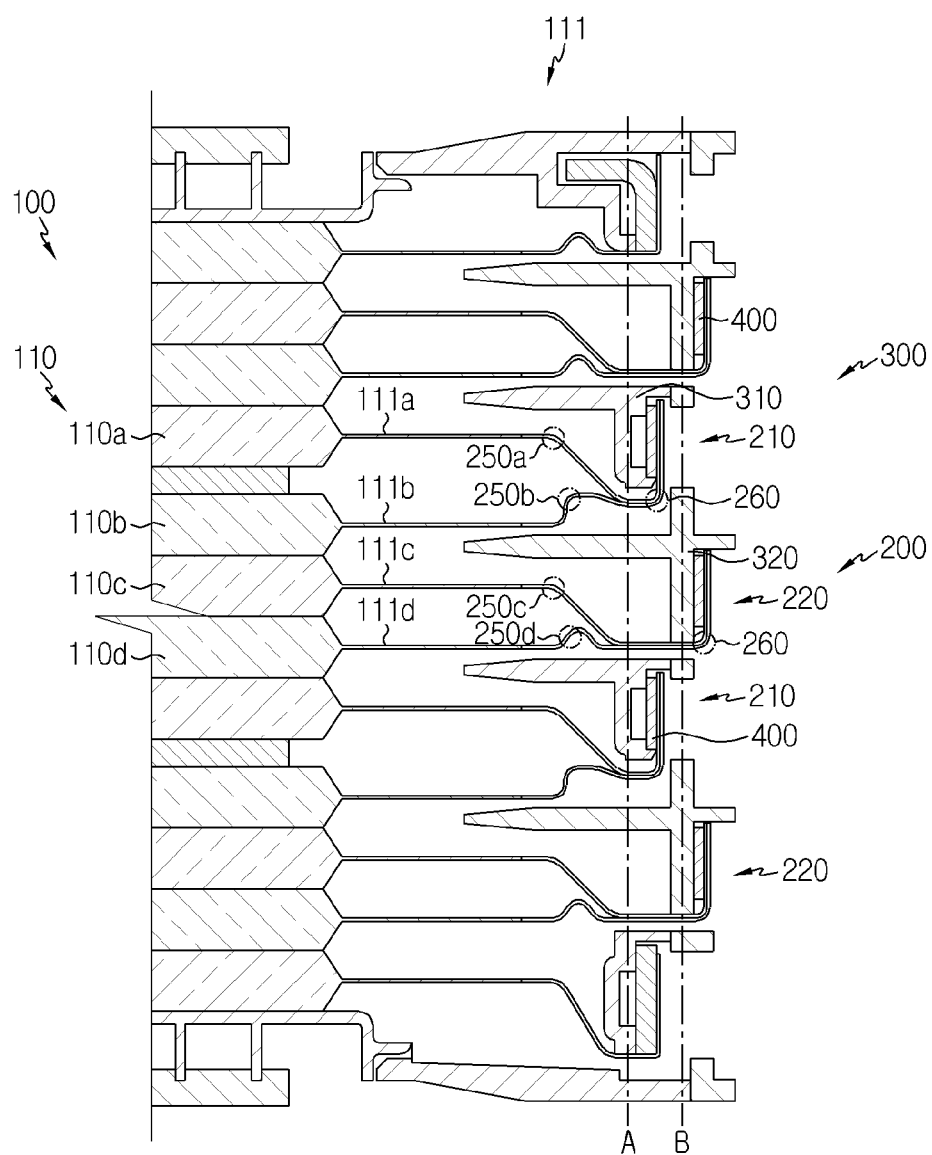
FIG. 4 is a cross-sectional view showing that a second electrode lead connection is coupled to a second ICB cover at the battery module according to an embodiment of the present disclosure.
Figure 5:
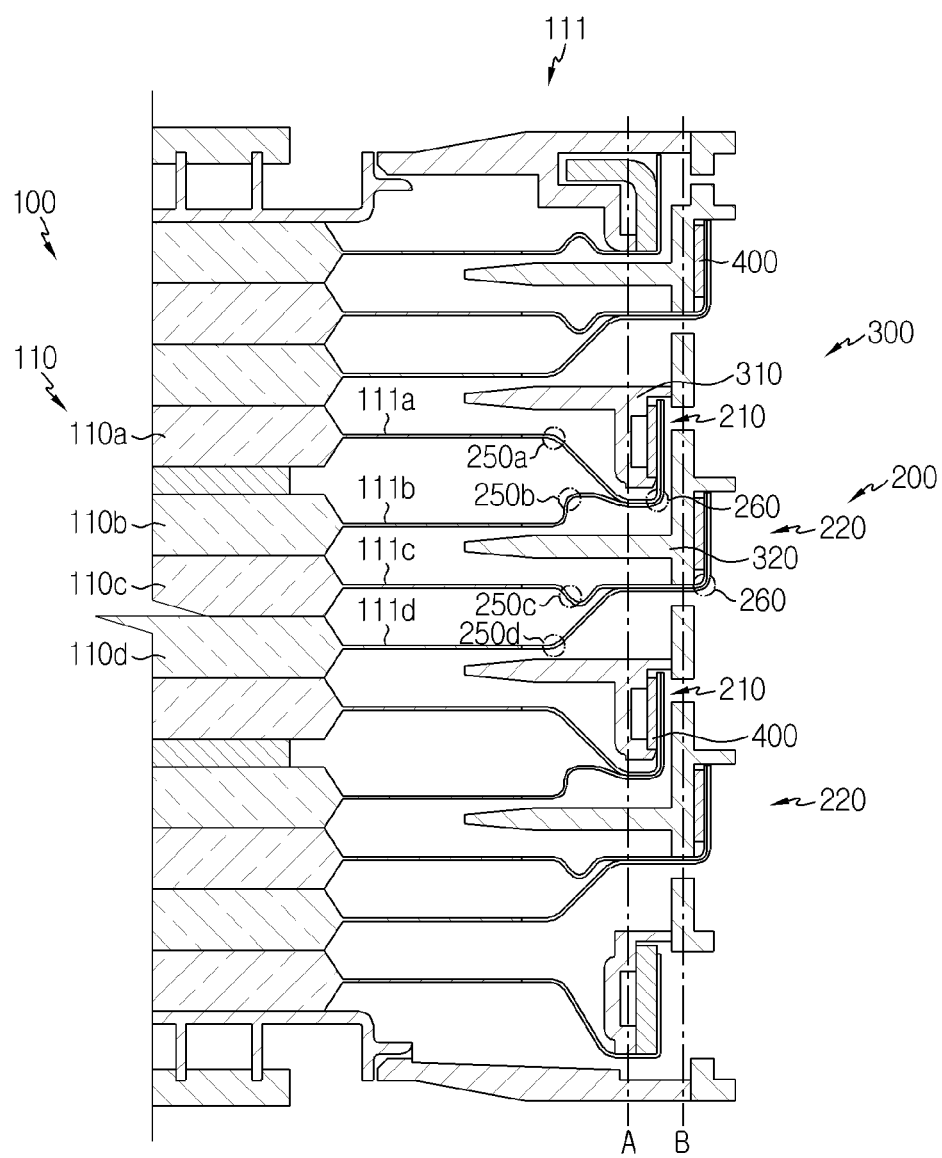
FIG. 5 is a cross-sectional view showing a battery module according to another embodiment of the present disclosure.

FIG. 3 is a cross-sectional view showing that a first electrode lead connection is coupled to a first ICB cover at a battery module according to an embodiment of the present disclosure, FIG. 4 is a cross-sectional view showing that a second electrode lead connection is coupled to a second ICB cover at the battery module according to an embodiment of the present disclosure, and FIG. 5 is a cross-sectional view showing a battery module according to another embodiment of the present disclosure.

Referring to FIGS. 3 and 4, a battery module 10 according to an embodiment of the present disclosure includes a battery cell stack 100 and an interconnect board (ICB) cover 300.

The battery cell stack 100 includes a plurality of battery cells 110 having electrode leads 111. The electrode lead 111 provided at the battery cell 110 is a type of terminal that is exposed to the outside and connected to an external device and may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. The electrode lead 111 may be electrically coupled to a bus bar 400. The battery cell 110 may be configured such that a plurality of unit cells arranged in the order of a positive electrode plate, a separator and a negative electrode plate or bi-cells arranged in the order of a positive electrode plate, a separator, a negative electrode plate, a separator, a positive electrode plate, a separator and a negative electrode plate are stacked appropriately for the battery capacity.

The battery cell stack 100 may be configured such that the plurality of battery cells 110 are stacked on one another. Here, the battery cell 110 may have various structures, and the plurality of battery cells 110 may be stacked in various ways.

The battery cell stack 100 may include a plurality of cartridges (not shown) for accommodating the battery cells 110, respectively. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

An electrode lead connection 200 may be bent and coupled to the ICB cover 300. Here, the ICB cover 300 may include a bus bar 400, and the electrode lead connection 200, at which a plurality of electrode leads 111 are connected to each other, may be electrically connected to the bus bar 400 provided at the ICB cover 300. The electrode lead connection 200 may be provided such that the electrode lead 111 of any one battery cell 110 among the plurality of battery cells 110 and the electrode lead 111 of another battery cell 110 adjacent to any one battery cell 110 are connected to each other. For example, the electrode lead connection 200 may include a first electrode lead connection 210 and a second electrode lead connection 220. As shown in FIGS. 3 and 4, the first electrode lead connection 210 may be provided so that an electrode lead 111a of any one battery cell 110a and an electrode lead 111b of another neighboring battery cell 110b are connected to each other. In addition, the second electrode lead connection 220 may be provided so that an electrode lead 111c of any one battery cell 110c and an electrode lead 111d of another neighboring battery cell 110d are connected to each other.

As shown in FIGS. 3 and 4, the ICB cover 300 may be coupled to a bent portion of the electrode lead connection 200. Here, a plurality of the ICB covers 300 may be provided, and the plurality of ICB covers 300 may be arranged in different layers. If the plurality of ICB covers 300 are arranged in different layers, for example, this may means that the plurality of ICB covers 300 are disposed along different virtual straight lines, but the present invention is not limited thereto. The plurality of ICB covers 300 may be provided in various quantities. However, for the sake of convenience of explanation, the following description will be based on the case where two ICB covers 300, namely a first ICB cover 310 and a second ICB cover 320, are provided. For example, referring to FIGS. 3 and 4, the following description will be based on the case where the first ICB cover 310 is disposed along a virtual straight line A and the second ICB cover 320 is disposed along a virtual straight line B. If two ICB covers 300 are arranged in different layers as above, it is possible to obtain a predetermined welding pitch for welding between the electrode leads 111 even though the battery cells 110 have a small cell thickness. This will be explained later in detail.

The ICB cover 300 may include the first ICB cover 310 and the second ICB cover 320 as described above. Here, referring to FIGS. 3 and 4, the first ICB cover 310 is disposed at a location adjacent to the body of the battery cell 110, and the second ICB cover 320 is disposed at a location farther from the body of the battery cell 110 than the first ICB cover 310. In addition, the first electrode lead connection 210 is coupled to the first ICB cover 310, and the second electrode lead connection 220 is coupled to the second ICB cover 320. Here, a plurality of the first electrode lead connections 210 may be provided, and a plurality of the second electrode lead connections 220 may also be provided. The plurality of first electrode lead connections 210 and the plurality of second electrode lead connections 220 may be arranged alternately. That is, referring to FIG. 4, the first electrode lead connection 210 is disposed first, then the second electrode lead connection 220 is disposed, then the first electrode lead connection 210 is disposed again, then the second electrode lead connection 220 is disposed again, and so on. In this way, the first electrode lead connections 210 and the second electrode lead connections 220 may be alternately arranged. Here, the first electrode lead connections 210 and the second electrode lead connections 220 may be provided in various quantities. As described above, the first ICB cover 310 and the second ICB cover 320 are disposed along different virtual straight lines, and the first electrode lead connection 210 and the second electrode lead connection 220 are respectively coupled to the first ICB cover 310 and the second ICB cover 320. Thus, the first electrode lead connection 210 and the second electrode lead connection 220 are also disposed along different virtual straight lines. In addition, referring to FIGS. 3 and 4, the first electrode lead connection 210 and the second electrode lead connection 220 adjacent to the first electrode lead connection 210 may be bent without contacting each other since they are disposed along different virtual straight lines. By doing so, the battery module 10 according to an embodiment of the present disclosure may obtain a predetermined welding pitch for welding between the electrode leads 111. To this end, a first bent portion of the first electrode lead connection 210 and a first bent portion of the second electrode lead connection 220 may be bent to have different angles, thereby preventing interference or contact with each other. Alternatively, the first bent portion of the first electrode lead connection 210 and the first bent portion of the second electrode lead connection 220 may be bent to have different shapes, thereby preventing interference or contact with each other. In detail, referring to FIGS. 3 and 4, for example, each of the electrode lead connections 200, namely the first electrode lead connection 210 and the second electrode lead connection 220, may include a first bent portion 250a-d and a second bent portion 260. The first bent portion 250a-d of the electrode lead connection 200 is a portion bent from a linear portion of the electrode lead 111, and the second bent portion 260 of the electrode lead connection 200 is portion bent at a region extending from the first bent portion 250. The first electrode lead connection 210 may have a first bent portion 250a for the electrode lead 111a of any one battery cell 110a and a first bent portion 250b for the electrode lead 111b of another battery cell 110b, and the second electrode lead connection 220 may have a first bent portion 250c for the electrode lead 111c of any one battery cell 110c and a first bent portion 250d for the electrode lead 111d of another battery cell 110d. Here, the first bent portion 250a of the first electrode lead connection 210 and the first bent portion 250c of the second electrode lead connection 220 may be configured to have the same angle, and the first bent portion 250b of the first electrode lead connection 210 and the first bent portion 250d of the second electrode lead connection 220 may be configured to have different angles. Alternatively, it is also possible that the first bent portion 250a of the first electrode lead connection 210 and the first bent portion 250c of the second electrode lead connection 220 have different angles and also the first bent portion 250b of the first electrode lead connection 210 and the first bent portion 250d of the second electrode lead connection 220 have different angles. By doing so, the first electrode lead connection 210 and the second electrode lead connection 220 may be bent without contacting each other. Alternatively, at least one of the first bent portions 250a, 250b, 250c, 250d may be formed to have a different shape so that the first electrode lead connection 210 and the second electrode lead connection 220 are bent without contacting each other. Meanwhile, the first electrode lead connection 210 and the second electrode lead connection 220 may be bent without contacting with each other in more various ways. For example, referring to FIG. 5, the first bent portions 250a, 250b of the first electrode lead connection 210 and the first bent portions 250c, 250d of the second electrode lead connection 220 may be bent in directions opposite to each other, and the first electrode lead connection 210 and the second electrode lead connection 220 may be prevented from contacting each other by this bending method.

Hereinafter, the operation and effect of the battery module 10 according to an embodiment of the present disclosure will be described with reference to the drawings.

Referring to FIGS. 3 and 4, the ICB cover 300 may include a plurality of ICB covers, for example a first ICB cover 310 and a second ICB cover 320, and the electrode lead connection 200 may be bent and connected to each ICB cover 300. Here, the first ICB cover 310 and the second ICB cover 320 may be disposed in different layers, for example along different virtual straight lines, and the first electrode lead connection 210 and the second electrode lead connection 220 respectively coupled to the first ICB cover 310 and the second ICB cover 320 may also be disposed along different virtual straight lines.

Figure 2:
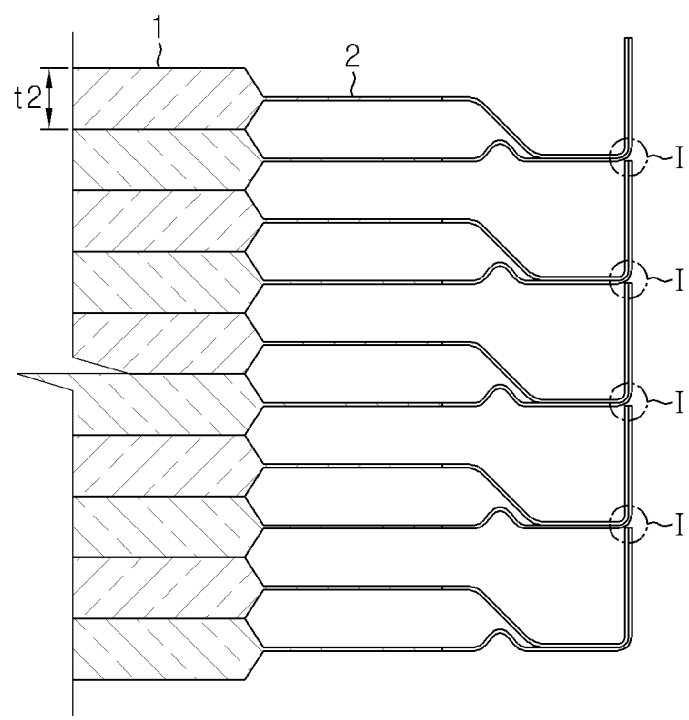
FIG. 2 is a cross-sectional view showing that an interference occurs at electrode leads when the cell thickness is reduced at the conventional battery cell.

Since the first electrode lead connection 210 and the second electrode lead connection 220 are disposed along different virtual straight lines, the first electrode lead connection 210 and the second electrode lead connection 220 may be appropriately bent without contacting each other, namely without interfering with each other, which is different from the conventional arrangement where the electrode leads 2 are arranged on a straight line and thus interfere with each other at a bending portion (see the portion I in FIG. 2). By doing so, the battery module 10 according to an embodiment of the present disclosure may obtain a predetermined welding pitch for welding between the electrode leads 111 even though the battery cells 110 have a small cell thickness, and thus it is possible to improve the welding quality.

Hereinafter, the function and effect of a battery module 10 according to an embodiment according to the present disclosure will be described with reference to the drawings, but features common to the battery module 10 according to the former embodiment of the present disclosure will not be described again in detail.

First, a plurality of battery cells 110 respectively having electrode leads 111 are stacked on one another (see FIGS. 3 and 4).

Next, the electrode lead connection 200 connects together the electrode lead 111 of any one battery cell 110 among the plurality of battery cells 110 and the electrode lead 111 of another battery cell 110 adjacent to that battery cell 110, and the electrode lead connection 200 is bent and coupled to the ICB cover 300. A plurality of ICB covers 300 is provided, and the plurality of ICB covers 300 are arranged in different layers. Arranging the plurality of ICB covers 300 to have different layers may mean that, for example, the plurality of ICB covers 300 are arranged on different virtual straight lines. Here, the ICB cover 300 includes a first ICB cover 310 and a second ICB cover 320. Also, the first ICB cover 310 is disposed at a position adjacent to the body of the battery cell 110, and the second ICB cover 320 is disposed at a location farther from the body of the battery cell 110 than the first ICB cover 310. In addition, the plurality of first electrode lead connections 210 are bent and welded to the first ICB cover 310, and the plurality of second electrode lead connections 220 are bent and welded to the second ICB cover 320. Namely, the plurality of first electrode lead connections 210 are initially bent and coupled to the first ICB cover 310 by welding (see FIG. 3), and then the plurality of second electrode lead connections 220 are bent and coupled to the second ICB cover 320 by welding (see FIG. 4). Here, referring to FIG. 4, the electrode lead connection 200 includes a first bent portion 250 bent from the linear portion of the electrode lead 111 and a second bent portion 260 bent at a region extending from the first bent portion 250, and the first electrode lead connection 210 and the second electrode lead connection 220 may be bent without contacting each other by having the first bent portions 250a, 250b of the first electrode lead connection 210 and the first bent portions 250c, 250d of the second electrode lead connection 220 bent so as to have different angles or different shapes.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further include a case for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module and a method for manufacturing the battery module, and is particularly applicable to industries associated with a secondary battery.

What is claimed is:

1. A battery module, comprising:
a battery cell stack including a plurality of battery cells each having at least one electrode lead extending from a first end of the respective battery cell outwardly along an extension direction, the plurality of battery cells being stacked on one another along a stacking direction transverse to the extension direction such that the first ends of the plurality of battery cells in the battery cell stack collectively define a first side of the battery cell stack extending along the stacking direction;
a first interconnect board (ICB) cover having at least one first bus bar to which at least one first electrode lead connection that is bent is coupled, the at least one first bus bar having a first cross-sectional area in a first plane that contains the extension direction and the stacking direction, the at least one first electrode lead connection comprising an electrode lead extending from the first end of any first one of the plurality of battery cells and connected to an electrode lead extending from the first end of a second battery cell adjacent to the first battery cell, the first ICB cover being arranged such that a centroid of the first cross-sectional area of the at least one first bus bar is positioned at a first location spaced apart from the first side of the battery cell stack by a first distance in the extension direction; and
a second interconnect board (ICB) cover having at least one second bus bar to which at least one second electrode lead connection that is bent is coupled, the at least one second bus bar having a second cross-sectional area in the first plane, the at least one second electrode lead connection comprising an electrode lead extending from the first end of any third one of the plurality of battery cells and connected to an electrode lead extending from the first end of a fourth battery cell adjacent to the third battery cell, the second ICB cover being arranged such that a centroid of the second cross-sectional area of the at least one second bus bar is positioned at a second location spaced apart from the first side of the battery cell stack by a second distance in the extension direction, wherein the first distance is smaller than the second distance.

2. The battery module according to claim 1,
wherein the first ICB cover includes a plurality of first bus bars disposed along a first plane spaced apart from the first side of the battery cell stack by the first distance in the extension direction, and wherein the second ICB cover includes a plurality of second bus bars disposed along a second plane spaced apart from the first side of the battery cell stack by the second distance in the extension direction.

3. The battery module according to claim 2, comprising:
a plurality of the first electrode lead connections each coupled to a respective one of the first bus bars of the first ICB cover, and a plurality of the second electrode lead connections each coupled to a respective one of the second bus bars of the second ICB cover, and
wherein the first bus bars and the second bus bars alternate with one another along the stacking direction.

4. The battery module according to claim 3,
wherein the plurality of first electrode lead connections are bent without contacting the plurality of second electrode lead connections.

5. The battery module according to claim 4,
wherein each of the first and second electrode lead connections has a first bent portion bent from a linear portion of the respective electrode lead and a second bent portion bent at a region extending from the first bent portion.

6. The battery module according to claim 5,
wherein the first bent portion of each of the first electrode lead connections are bent to have different angles or different shapes than the first bent portion of each of the second electrode lead connections.

7. The battery module according to claim 5,
wherein the first bent portion of each of the first electrode lead connections are bent in directions opposite to the first bent portion of each of the second electrode lead connections.

8. A battery pack, comprising a battery module defined in claim 1.

9. A vehicle, comprising a battery module defined in claim 1.

10. The battery module according to claim 1, wherein the at least one first electrode lead connection is coupled to an outer face of the at least one first bus bar, the outer face of the at least one first bus bar facing away from the first side of the battery cell stack in the extension direction; and
wherein the at least one second electrode lead connection is coupled to an outer face of the at least one second bus bar, the outer face of the at least one second bus bar facing away from the first side of the battery cell stack in the extension direction.

11. A method for manufacturing a battery module, comprising:
(a) providing a plurality of battery cells each having at least one electrode lead extending from a first end of the respective battery cell outwardly along an extension direction, and stacking the plurality of battery cells on one another along a stacking direction transverse to the extension direction such that the first ends of the plurality of battery cells in the battery cell stack collectively define a first side of the battery cell stack extending along the stacking direction;
(b) bending at least one first electrode lead connection, and coupling the at least one first electrode lead connection to at least one first bus bar of a first interconnect board (ICB) cover, the at least one first bus bar having a first cross-sectional area in a first plane that contains the extension direction and the stacking direction, a centroid of the first cross-sectional area of the at least one first bus bar being positioned at a first location spaced apart from the first side of the battery cell stack by a first distance in the extension direction, the at least one first electrode lead connection comprising an electrode lead extending from the first end of any first one of the plurality of battery cells and connected to an electrode lead extending from the first end of a second battery cell adjacent to the first battery cell; and
(c) bending at least one second electrode lead connection, and coupling the at least one second electrode lead connection to at least one second bus bar of a second interconnect board (ICB) cover, the at least one second bus bar having a second cross-sectional area in the first plane, a centroid of the second cross-sectional area of the at least one second bus bar being positioned at a second location spaced apart from the first side of the battery cell stack by a second distance in the extension direction, the at least one second electrode lead connection comprising an electrode lead extending from the first end of any third one of the plurality of battery cells and connected to an electrode lead extending from the first end of a fourth battery cell adjacent to the third battery cell, wherein the first and second ICB covers are arranged with respect to the battery cell stack such that the first distance is smaller than the second distance.

12. The method for manufacturing a battery module according to claim 11,
wherein the step (b) includes: bending and welding a plurality of the first electrode lead connections to a respective plurality of the first bus bars of the first ICB cover, and
wherein the step (c) includes: bending and welding a plurality of the second electrode lead connections to a respective plurality of the second bus bars of the second ICB cover.

13. The method for manufacturing a battery module according to claim 12,
wherein the step (b) includes:
bending the plurality of first electrode lead connections without contacting the plurality of second electrode lead connections.

14. The method for manufacturing a battery module according to claim 13,
wherein each of the first and second electrode lead connections has a first bent portion bent from a linear portion of the respective electrode lead and a second bent portion bent at a region extending from the first bent portion, and
wherein the step (b) includes:
bending the first bent portion of each of the first electrode lead connections to have different angles or different shapes than the first bent portion of each of the second electrode lead connections.

15. The method for manufacturing a battery module according to claim 11,
wherein the step (b) includes: coupling the at least one first electrode lead connection to an outer face of the at least one first bus bar, the outer face of the at least one first bus bar facing away from the first side of the battery cell stack in the extension direction, and
wherein the step (c) includes: coupling the at least one second electrode lead connection to an outer face of the at least one second bus bar, the outer face of the at least one second bus bar facing away from the first side of the battery cell stack in the extension direction.

* * * * *